Oct. 6, 1942.   P. MESHBERG   2,298,065
BRAKE TESTER DEVICE FOR AUTOMOBILES OR LIKE VEHICLES
Filed July 28, 1937
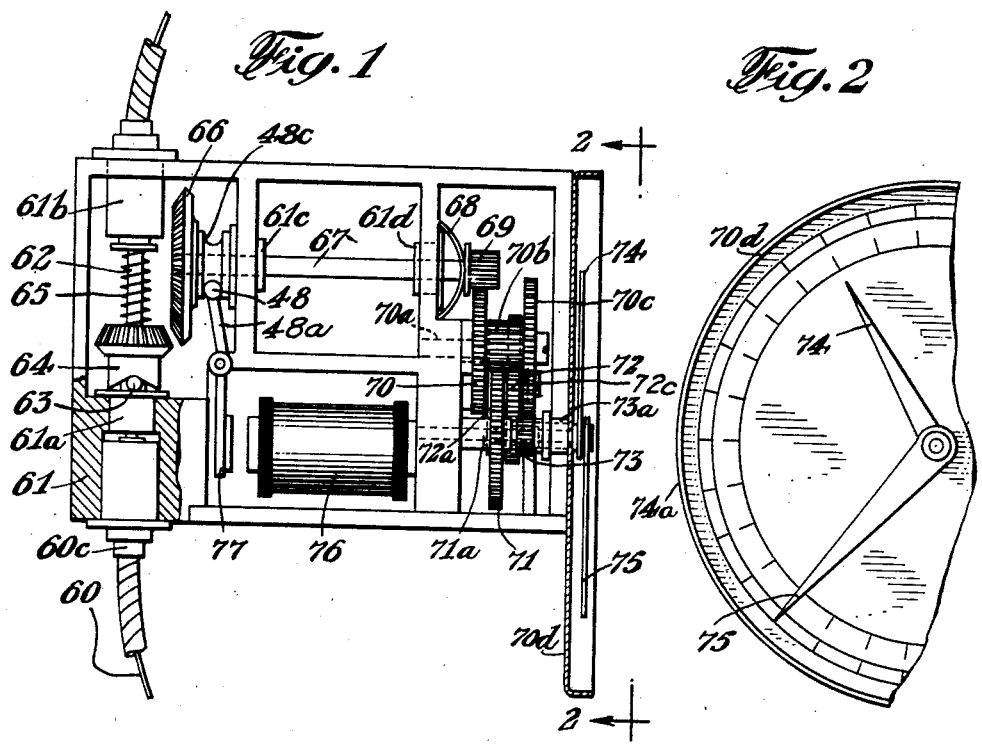
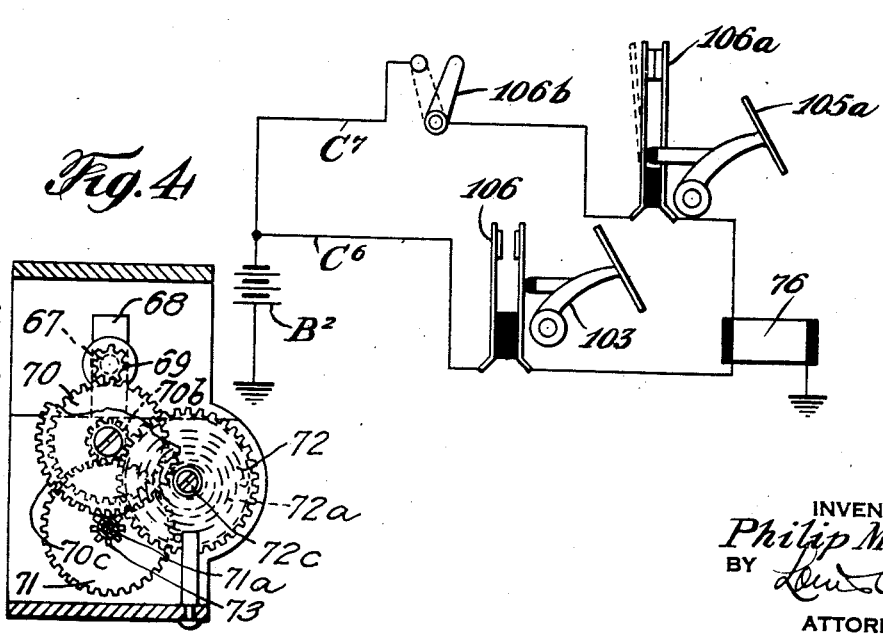
INVENTOR
Philip Meshberg
BY
ATTORNEY Patented Oct. 6, 1942

2,298,065

UNITED STATES PATENT OFFICE 2,298,065

BRAKE TESTER DEVICE FOR AUTOMOBILES OR LIKE VEHICLES

Philip Meshberg, New York, N. Y.

Application July 28, 1937, Serial No. 156,175

4 Claims. (Cl. 73—51)

My invention relates to that class of brake tester indicating devices for automobiles or similar vehicles upon which the travel distance of said automobiles or like vehicles may be accurately measured after the brake in said vehicles had been applied. Such a device has contained within itself means for registering the exact number of feet that a vehicle has travelled. The brake tester indicating device is preferably mounted on the dashboard thereby being clearly visible to the driver of the vehicle.

My invention is also an improvement on my pending application Serial No. 80,319, filed May 18, 1936, now Patent No. 2,192,602, to which this application is subject.

The object of my invention is to provide a device that will measure the stopping distance of a moving vehicle. By stopping distance is meant the distance the vehicle travels from the moment the operator of said vehicle lifts his foot from the accelerator and applies the vehicle brake pedal plus the distance the vehicle travels from the time the brakes become effective to the time the car comes to a stop.

The measurement of the stopping distance aforesaid is accomplished by my invention which is made operable preferably through the medium of an electric circuit, said circuit including a switch attached to the accelerator of said vehicle or parts adjoining said accelerator. The switch aforesaid closing said electric circuit when the accelerator or gasoline supply pedal of said vehicle is released to enable the operator to bring said vehicle to a stop.

Further objects of this invention will appear as the description of the same proceeds.

Referring to the drawing—

Fig. 1 is a side view of the "Stopometer."

Fig. 2 is a partial front view on a line 2—2 of Fig. 1.

Fig. 3 is a circuit diagram showing the manner of closing the circuit by either the brake pedal or accelerator.

Fig. 4 is a view in elevation of the train of gears as shown in Fig. 1.

I have termed the brake tester device herein described a "Stopometer" which while being an arbitrary term is more illustrative of my device and further differentiates said invention from devices of similar nature.

Referring to Fig. 1, there is illustrated a modification of a brake tester device utilizing an open face clock dial in lieu of numbering wheels as shown in my copending application Serial No. 80,319, filed May 18, 1936.

The revolving flexible shaft 60 is secured by means of the coupling 60c to the casing 61. A pin 63 is secured into the shaft 62 that is driven by the shaft 60. The said shaft 62 is revoluble in bearings 61a and 61b. A bevel gear 64 is slidable relative to the shaft 62. The lower section of said gear terminates into a V-shaped grooved hub and the groove thereof rests upon the pin 63.

Due to the pressure of the spring 65 against the bevel gear 64 the grooved base of which rests upon the pin 63 said pin being integral to the shaft 62 causes the bevel gear 64 to revolve with the shaft 62.

A bevel gear 66 is secured to the shaft 67, said shaft revolving in bearings 61c and 61d. A bow spring 68 is mounted upon the shaft 67, said spring exerting a pressure upon the hub of the pinion gear 69 that is secured integrally to the shaft 67.

A gear train is shown in Fig. 1; said gear train consisting of the pinion 69 integrally secured to the shaft 67 and engaging with the gear wheel 70 which is integral to pinion 70b, the latter rotating upon a shaft 70a. The pinion 70b, which is included in said gear train, is integral to gear 70c, the latter rotating upon said shaft 70a. Pinion 70b engages with gear 71 which rotates shaft 71a. The shaft 71a extends beyond the dial casing 70d. The said gear 70c is integral to said pinion 70b and rotates upon the same shaft 70a as stated and engages with the pinion 73. The pinion 73 is secured to the tubular shaft 73a, the latter rotating on the shaft 71a. The dial pointer 74 is secured to the tubular shaft 73a. The dial pointer 75 is secured to the shaft 71a. A reset spring 72a is wound by the gear 72; said gear 72 rotates on a stud 72c set in the inner frame of the device as shown in Fig. 4. The gear 72 engages with the pinion 70b.

The operation of the device as shown in Fig. 1 is as follows:

When the brake pedal 103 is depressed by the car operator's foot a circuit similar to that shown in Fig. 3 is closed thereby energizing the magnet 76 and in turn attracting armature 77. The armature 77 has a back stroke lever 48a which terminates in a ball point 48, said ball point fitting into a curved neck 48c of the bevel gear 66. The action above referred to causes the bevel gear 66 to engage with the bevel gear 64 which rotates while the car is in motion. The aforesaid car movement causes shaft 67 to rotate and with it the train of gears as described.

In the train of gear arrangement just described the indicating limit is governed by the reset gear and spring, 72 and 72ᵃ respectively.

It is obvious that the reset gear will set the indications to normal when the circuit is broken.

Referring to Fig. 3 which shows the electric circuit that includes the accelerator lever 105ᵃ, and the brake lever 103. The accelerator lever controls the contacting switch 106ᵃ, and the brake lever 103 controls the switch 106. When it is desired to register the stopping distance from the moment the car operator's foot is lifted from the accelerator lever 105ᵃ, the switch 106ᵇ is closed. When this occurs the circuit may be traced from the ground connection of the magnet 76 to the switch 106ᵃ, through switch 106ᵇ, through branch wire C⁷ to battery B² to ground. When it is desired to register the stopping distance from the time the brake is operated, the switch 106ᵇ is opened as shown in Fig. 3. In this case the circuit can be traced from the ground at the battery B² through branch wire C⁶ to the switch 106 to the magnet 76 to ground.

An important feature of this invention is in the fact that the registered indications of travel of the car remains fixed after the brakes had been applied and the car had come to a stop and said indications are visible to the operator; and although the driver has lifted his foot from the brake pedal thus breaking the "Stopometer" circuit, the mechanism of said "Stopometer" is not restored to zero until the car is started to move again.

The arrangement aforesaid enables a more leisurely opportunity to observe the registered travel of said car after the brakes had been applied and prior to the restarting of said car.

In Fig. 2 is shown the dial 70ᵈ and the dial pointers 74 and 75 respectively. The pointer 74 indicates the car travel in foot or lesser lengths while the pointer 75 indicates in 25 foot or greater lengths of car travel. The above distance settings are merely given as examples. It is obvious that any desired setting may be arranged in conformity with the design of the instrument.

The function of the bevel gears 64 and 66 as described makes possible the resetting of the pointers 74 and 75.

The curvature of the bow spring 68 is adjustably conformed in a manner to hold the shaft 67 in a sufficiently forward position to permit the bevelled section of each of the gears 64 and 66 to remain lightly in contact with each other after the car has stopped, said stoppage thereby stopping the rotatable movement of the shaft 67 in said device. The gear 66 as stated, being lightly in engagement with the gear 64, and although the bow spring 68 exerts a slight pressure against the pinion 69 which is integral to the shaft 67, said action is not sufficient to totally disengage the bevel gear 66 from the bevel gear 64. However, complete disengagement of said gears is caused by the revolution of the bevel gear 64 upon the restarting of the car. It will be understood that the aforesaid action takes place only after the magnet 76 had been deenergized, said deenergization permitting the disengagement of both bevel gears, due first, to the resilient action of the bow spring 68 and, second, by the rotatable movement of the driving gear 64. In this manner the registered indications of said car travel remain set and in view as stated.

When the car starts to move again, and the flexible shaft is thereby caused to rotate the rapid rotation of the bevel gear 64 forces the bevel gear 66 completely out of engagement with its companion gear due to the release of the brake at this time thereby opening the brake circuit and the consequent deenergization of the magnet 76, and the armature thereof failing to hold the gear 66 in substantial engagement with its companion 64. The resultant effect of the foregoing action is to cause the resetting mechanism to set the pointers 74 and 75 to zero position through the action of the stored energy of the spring 72ᵃ.

As already stated, it is desirable to have the foregoing registry of the pointers 74 and 75 remain fixed after the car has stopped, said fixed registry to remain visible up to the time the car is started again.

Such registry indication would be of value in the event of an accident, said registry indicating the exact distance the car had travelled after the stopping means of said car had been applied for the purpose of effecting said stoppage.

Fig. 3 shows a combination circuit including therein a brake operated switch and a gas pedal operated switch as indicated in the figure. The switch 106 is normally open. When the car is required to be stopped the brake 103 is depressed and said action closes the switch 106 whereupon current pulses flow through the circuit C⁶ and energizing the magnet 76, the latter operating the mechanism in the "Stopometer" unit.

In the event the operator desires to operate the "Stopometer" by means of the gas pedal, there is provided a switch 106ᵃ, said switch being normally closed. A hand operated switch 106ᵇ is further provided in the circuit C⁷. When the car operator desires to obtain the registry of the stopping distance of the car said stopping distance being equal to reaction distance plus braking distance as already stated, said operator closes the switch 106ᵇ and removes his foot from the gas pedal 105ᵃ, the circuit C⁷ is closed and the current therein energizes the magnet 76 in said "Stopometer" unit in the manner previously described.

While the invention has been described in detail with specific examples, such examples are illustrative and are not given as limitations, since other modifications within the spirit and scope of the invention will be apparent to those skilled in the art. Hence the invention is to be understood as limited only as indicated in the appended claims, in which the intent is to set forth all the novelty over the prior art.

Now having described my invention what I claim is:

1. In a brake tester device for indicating distance an automobile or like vehicle has traveled after the stopping means of said vehicle had been applied, a flexible shaft revoluble through the medium of the road wheel of said vehicle, a rotatable member made revoluble by said flexible shaft, a pin attached to said rotatable member, a first bevel gear having an inverted V-base resting upon said pin, a spring holding said bevel gear resiliently in position upon said pin, a rod shaft in said device, a second spring mounted on said rod shaft; a second bevel gear mounted on said rod shaft, said second bevel gear in operable engagement with said first bevel gear, said engagement occurring when said rod shaft with said second bevel gear thereon is moved forward, an electro-magnet in said device having an armature contiguous to said rod shaft for impelling said rod shaft and said second bevel gear forward, an electric circuit connected with said electro-magnet, said circuit controllable on the application of said stopping means, a pinion gear on said rod shaft, a train of gears engaged with said pinion gear, spring resetting means included in said train of gears, pointer indicator means in said device whereby distance of travel of said vehicle may be indicated from the time said stopping means is applied, said train of gears in operable engagement with said pointer indicator means; said second bevel gear on said rod shaft staying in light engagement with said first bevel gear after the stopping means have been released and the circuit to said electro-magnet broken, said second spring causing a light resilient horizontal pressure upon said rod shaft and second bevel gear integral thereto away from said first bevel gear, means operative on the restarting of said vehicle and including said spring on said rod shaft for causing backward movement of said rod shaft and said second bevel gear and the disengagement of said second bevel gear from said first bevel gear, and means including said spring resetting means for resetting said pointer indicating means to zero position on the disengagement of said bevel gears.

2. In a device for indicating the stopping distance of a vehicle provided with control means including a brake pedal and a gas pedal, an electric circuit in said vehicle, said circuit including a switch controlled by said brake pedal of said vehicle, a second switch included in said circuit controlled by the movement of the gas pedal of said vehicle, an electro-magnet and a battery means included in said circuit; shafting means revoluble through the medium of the road wheel of said vehicle, a first rotatable gear member integral to and made revoluble with said shaft, a second rotatable gear member, said second rotatable gear member being engageable with said first rotatable gear member through the medium of said electro-magnet, registering means in operable connection with said second rotatable gear member, whereby registry is made on said registering means upon the engagement of said second rotatable gear member with said first rotatable gear member integral to said revoluble shafting means, and a manually operated switch included in said circuit, said manually operated switch for connecting or disconnecting electrically said second named switch, whereby the operator of said vehicle is enabled to obtain the stopping distance thereof first from the moment the gas pedal shall have been released, and second, with said manually operated switch open, to obtain the stopping distance of said vehicle from the moment said brake pedal shall have been applied.

3. In a device for indicating the stopping distance of a vehicle provided with control means including a brake pedal, a flexible shaft in said vehicle, said flexible shaft revoluble through the medium of the road wheel of said vehicle, a first gear attached to said shaft, a rod shaft in said device, a second gear attached thereto, a spring in resilient connection with said rod shaft, said rod shaft operably connected with indicating means in said device, spring resetting means operably connected with said indicating means, an electrc circuit in connection with said device, said circuit having a battery included therein, said circuit adapted to be closed by the application of said brake pedal, an electro-magnet in said device and included in said circuit, an armature in operable connection with said electro-magnet, said armature in operable connection with said second gear to cause engagement thereof with said first gear upon the closing of said circuit, said second gear on said rod shaft held in light pressure engagement with said first gear after said vehicle shall have stopped and the circuit to said electro-magnet broken by the release of said brake pedal, the light pressure engagement being due to said spring, both of said gears becoming disengaged upon the restarting of said vehicle due to the consequent revoluble movement of said flexible shaft and said first gear operably attached to said road wheel, the impulse due to the revoluble movement of said first gear to cause the throwing of said second gear free and clear of said first gear, said release enabling the resetting of said indicating means to zero position through the medium of the spring resetting means in the indicating means aforesaid.

4. In a device for indicating the stopping distance of a vehicle provided with control means including a brake pedal and a gas pedal, said device including an electric circuit, said circuit including a switch controlled by the brake pedal of said vehicle, said switch normally open when said brake pedal is not applied, a second switch included in a branch of said circuit, said second switch controlled by the gas pedal of said vehicle, said second switch normally closed when said gas pedal is lifted, manually operated switch means enabling the operator of said car to open or close said branch circuit thereby connecting or disconnecting said second switch in said circuit, a battery in said circuit, a magnet also included in said circuit, said magnet having an armature, the movement thereof controlling traveling distance indicator means in said vehicle, said operator of said vehicle being enabled through the medium of said first and second switches and the manipulation of said manually operated switch means to ascertain upon reading said indicator means first, the distance said vehicle has traveled from the time said gas pedal has been lifted, or second, the distance said vehicle has traveled from the time said brake pedal had been applied.

PHILIP MESHBERG.